UNITED STATES PATENT OFFICE.

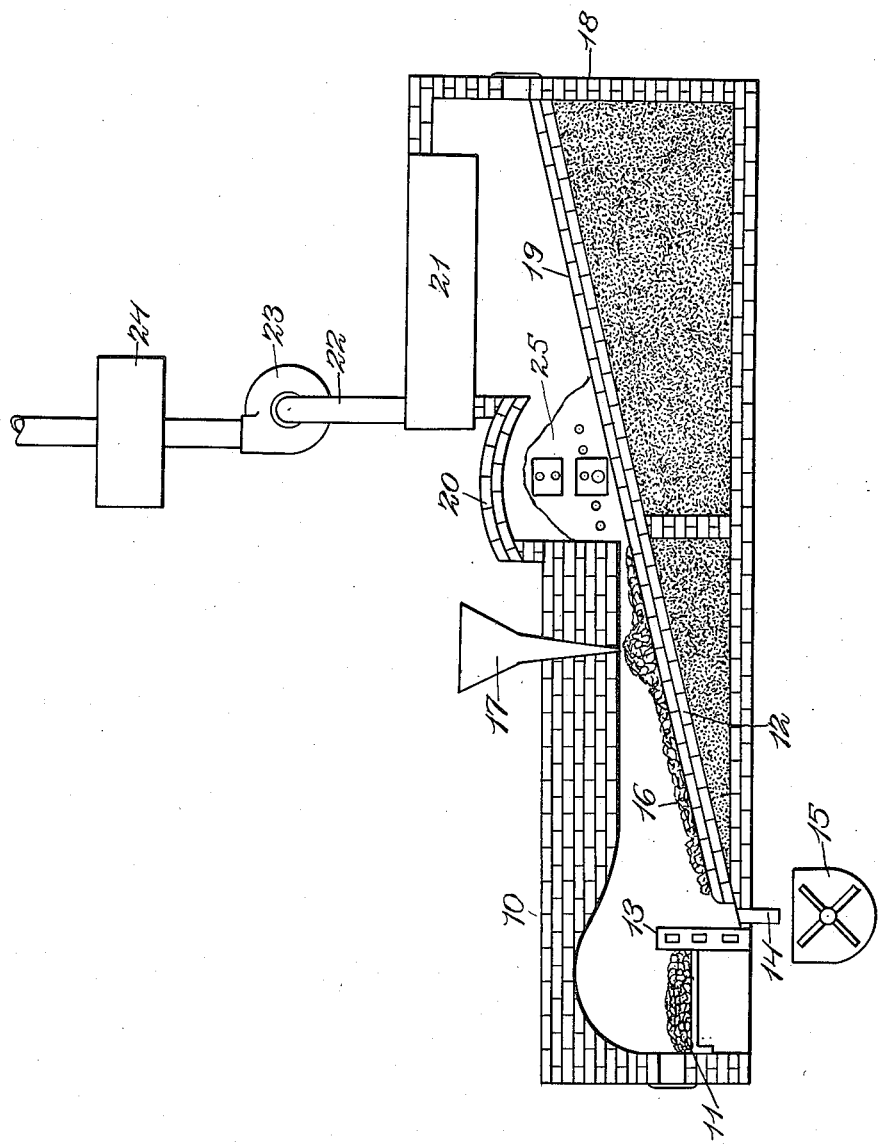

HUGH KELSEA MOORE, OF BERLIN, NEW HAMPSHIRE.

PROCESS OF MAKING SODIUM SULFID.

1,130,317. Specification of Letters Patent. Patented Mar. 2, 1915.

Application filed August 14, 1913. Serial No. 784,803.

*To all whom it may concern:*

Be it known that I, HUGH K. MOORE, a citizen of the United States, and a resident of Berlin, in the county of Coos and State of New Hampshire, have invented certain new and useful Improvements in Processes of Making Sodium Sulfid, of which the following is a specification.

In the manufacture of wood pulp by the sulfate process so-called, the strength of the paper depends upon the proper amount or proportion of sodium sulfid contained in the alkaline liquor which is employed in cooking the raw material. Where the solution is rich in caustic soda but weak in sodium sulfid, the paper into which the pulp is manufactured does not possess the strength or properties of kraft paper so-called which is usually made of sulfate pulp. Sodium sulfid is an expensive substance, and, if it were necessary to purchase it on the market in large quantities, the cost of production of the pulp would be prohibitive.

The object of the present invention is to provide an inexpensive process for the manufacture of sodium sulfid from sodium sulfate. As will be subsequently explained in detail, this may be obtained by smelting sodium sulfate in the presence of carbon and collecting the molten effluent in dissolving tanks containing water or a weak alkaline solution. Although sodium sulfate has a relatively low melting point, yet, when it is acted upon by carbon or hydrogen or other reducing agents for the formation of sodium sulfid, there must be intense heat to maintain the sodium sulfid in its molten condition so that it may flow from the retort or furnace into the dissolving tanks. It is difficult and practically impossible to secure the necessary heat to produce and maintain the sodium sulfid in its molten condition so that it will flow from the heating chamber. This can be accomplished as a laboratory experiment in an electrical furnace, but the consumption of electricity required to produce the necessary heat is so great that, as a practical or commercial matter, the use of an electric furnace for this purpose is out of the question. Moreover, whereas sodium sulfid will not melt or remain molten under a temperature of 2,000° C., on the other hand, when exposed to a current of air, it will sublime at approximately 1,200° C. and will be re-converted into sulfate by the products of combustion in the retort, or it will be converted into the sodium carbonate with a loss of the sulfur as $SO_2$. I have discovered that, when the sodium sulfate is fused with and dissolved in sodium carbonate, I am able, at a relatively low temperature, to obtain and maintain the fluidity of the sodium sulfid produced by the reduction of the sulfate and thus to provide a continuous process in which the sulfid will be discharged continuously in molten condition as the effluent of the retort.

In practice, I employ a reverberatory furnace having a floor sloping downwardly toward the fire-pot, and upon the upper end of the floor I feed continuously predetermined quantities of sodium sulfate, sodium carbonate and finely divided carbon. In the fire-pot of the reverberatory furnace I burn coal, coke, oil or other fuel for the generation of the heat which is radiated by the arch upon the materials. The sulfate is melted at low temperature and is immediately reduced to sodium sulfid, fluxing with the carbonate and flowing in a continuous stream toward the fire-pot and being discharged from a spout in molten condition to the dissolving tank.

Instead of feeding the sodium carbonate in the furnace with the sodium sulfate and the carbon, it may be first reduced to molten condition in an adjacent retort and fed therefrom into the reverberatory furnace. Thus I may employ for this purpose the effluent of a smelting furnace in which the solid portion of the lignin liquor, resulting from the manufacture of sulfate pulp, is burned. In my co-pending application, Serial No. 784,801, filed August 14, 1913, I have fully described a process by which the lignin liquor is first concentrated, and then sprayed and evaporated in the presence of radiant heat in a combined smelting and boiler furnace. One of the products resulting from this process and present in the molten effluent is sodium carbonate in comparatively large proportions. By feeding this molten effluent into the reverberatory furnace, I save the heat which is necessary to fuse the carbonate and obviate the necessity of cooling and pulverizing the carbonate, and the labor necessary to handle it, with its consequent dangers. The molten effluent from the liquor-burning retort is discharged as a continuous stream, as pointed out in the said application, and may be fed continuously to the upper end of the reverberatory furnace into which the sodium sulfate and finely divided carbon is fed.

On the accompanying drawing, I have illustrated somewhat conventionally the apparatus which may be employed in carrying out the process, but I desire to have it understood that the drawing is only conventional and that no attempt is made to show the parts in their relative proportions or the details of their construction.

At 10 I have shown a reverberatory furnace having a fire-pot 11 in which may be burned fuel of any suitable character, such as coal, coke, oil, gas or the like. This furnace may be constructed in any suitable way to secure the desired results. The floor 12 of the furnace, beneath the arch, slopes from its receiving end toward the bridge wall 13, and closely adjacent the bridge wall there is a well terminating in a spout 14 from which the molten effluent is discharged into a dissolving tank 15 containing water or a weak alkaline solution. The floor of the furnace is preferably covered with a layer 16 of coke or other carbonaceous material formed in relatively large pieces, oil coke being preferred. At its receiving end, remote from the bridge wall, there is a hopper shown conventionally at 17 into which may be fed continuously sodium sulfate, sodium carbonate and finely divided carbon or other carbonaceous material, in approximately the following proportions:—142 parts by weight of sodium sulfate, 48 parts by weight of carbon, and 48 parts by weight of sodium carbonate. By the combustion of the fuel in the fire-pot, the arch is heated to a temperature approximating 1,203° C. to 1,371° C. which I find is sufficient for the purpose to secure the desired yield. The carbonate and sodium sulfate become molten and sulfate is reduced by the carbon to form sodium sulfid which fuses with and is dissolved in the molten sodium carbonate. The molten mass flows down under the layer 16 of carbon on the floor in a reducing atmosphere, the oxygen, passing beneath the arch with the products of combustion, being prevented from reaching the sulfid, by the layer of coke. The radiated heat from the arch heats the layer of carbonaceous material, and heat is conducted therefrom for the reaction of the sodium sulfate to sodium sulfid by the reducing agent. As the mass flows downwardly toward the well 15, it passes through zones of increasing heat and is discharged into the dissolving tank 15 continuously in a molten stream. All of the sodium sulfid is not recovered as such, because of the reaction of the greater part thereof with the water in the tank, being split up into sodium hydroxid and sodium hydrosulfid.

Instead of feeding the carbonate of soda with the sodium sulfate and the carbonaceous matter through the hopper into the furnace, the sodium carbonate may, as previously indicated, be fed into the upper end of the furnace in a molten condition. I have indicated at 18 a combined smelting and boiler furnace having a sloping floor 19 from which the molten effluent may flow directly onto the floor 12 of the furnace 10. Into the front portion of the retort beneath the arch 20 is sprayed concentrated lignin liquor, which, while in transit, is subjected to intense radiant heat generated by the combustion of any suitable fuel in the retort as explained in my said co-pending application. The products of combustion from the reverberatory furnace pass into the retort 18 and there mingling with the products of combustion formed in the retort, pass through the flues or tubes of a suitable boiler 21 and are carried upward through a stack 22 having a suitable exhaust fan 23 and a gas washer 24. The concentrated lignin liquor is blown into the retort in finely divided form and is evaporated so that the residuum falls on the floor of the furnace in a charred condition suitable to be burned as indicated at 25. Oxygen is supplied for the combustion of the residuum and the inorganic content of the residuum is smelted and flows in a constant stream into the reverberatory furnace. The molten effluent from the retort contains a large proportion of sodium carbonate and contains in addition some sodium sulfid and sodium sulfate. Consequently, the sodium carbonate, which it is desired to fuse with the sodium sulfate fed into the reverberatory furnace, is continuously supplied in molten condition.

By the arrangement of the two furnaces in series with the products of combustion of the reverberatory furnace being discharged into the retort or smelting furnace, I am able to utilize the products of combustion of the reverberatory furnace in generating steam in the boiler 21. If it were attempted to carry the products of combustion of the reverberatory furnace directly through boiler flues, the sublimation of the sodium sulfate and the sodium sulfid, passing off with the products of combustion, and the condensation of the fumes and the deposit of the sulfate in the boiler tubes would choke them in a very short time, but, inasmuch as the products of combustion from the reverberatory furnace are fed into the retort 18 below the spray of lignin liquor, any sublimed sulfid and sulfate are caught and entrained by the particles of the spray, and are carried down into the accumulation of residuum on the floor of the retort and are smelted and recovered.

What I claim is:

1. The herein described process which consists in smelting and fusing sodium sulfate and sodium carbonate in the presence of a reducing agent.

2. The herein described process which consists in feeding into a heating chamber sodium carbonate, sodium sulfate and a reducing agent, melting the same and reducing the sodium sulfate to sodium sulfid, fluxing the sodium carbonate and sodium sulfid, and withdrawing the same in molten condition.

3. The herein described process which consists in continuously reducing sodium sulfate to sodium sulfid by a reducing agent in the presence of sodium carbonate, fluxing the sodium sulfid and sodium carbonate, and reclaiming the products of sublimation by passing them through a liquid spray.

4. The herein described process which consists in reducing sodium sulfate by a reducing agent in the presence of sodium carbonate, fluxing the sodium sulfid and the sodium carbonate, causing the molten mass to flow under or through a carbonaceous material to prevent oxidation of the sulfid, and withdrawing the products of fusion.

5. The herein described process which consists in forming a layer of carbonaceous material, fusing sodium sulfate and sodium carbonate adjacent said layer, radiating heat to the carbonaceous material for the conduction of heat to the products of fusion whereby the heat for the endothermic reaction of the sulfate to sulfid is supplied, and continuously withdrawing the fused sodium sulfid and sodium carbonate.

6. The herein described process which consists in spraying lignin liquor resulting from the manufacture of sulfate pulp into a smelting chamber, smelting the inorganic content thereof for the formation of sodium carbonate, causing the smelted carbonate to flow in molten condition, continuously adding sodium sulfate to the flowing carbonate in the presence of a reducing agent, supplying heat for the reduction of the sulfate and the fusion of the sodium sulfid formed by such reaction, withdrawing the same in molten condition, and reclaiming the products of sublimation by passing them through the spray of lignin liquor.

In testimony whereof I have affixed my signature, in presence of two witnesses.

HUGH KELSEA MOORE.

Witnesses:
MARCUS B. MAY,
P. W. PEZZETTI.